US006725150B1

(12) United States Patent
Glandian

(10) Patent No.: US 6,725,150 B1
(45) Date of Patent: Apr. 20, 2004

(54) TURBO-CHARGED VEHICLE ENGINE SOUND SIMULATOR

(76) Inventor: Arthur Glandian, 1820 Fern La., Glendale, CA (US) 91208

( * ) Notice: Subject to any disclaimer, the term of this patent is extended or adjusted under 35 U.S.C. 154(b) by 0 days.

(21) Appl. No.: 10/359,311

(22) Filed: Feb. 7, 2003

(51) Int. Cl.[7] .................................................. G06F 19/00

(52) U.S. Cl. ........................... 701/115; 434/29; 434/62; 381/61; 381/71.5; 381/86

(58) Field of Search ........................... 701/115; 181/204, 181/206, 198; 434/62–71, 29; 381/61, 71.5, 86

(56) References Cited

U.S. PATENT DOCUMENTS 3,893,107 A * 7/1975 Schedler .................. 340/384.3
5,635,903 A * 6/1997 Koike et al. ................ 340/441

* cited by examiner

*Primary Examiner*—Willis R. Wolfe
*Assistant Examiner*—Johnny H. Hoang
(74) *Attorney, Agent, or Firm*—Albert O. Cota

(57) ABSTRACT

A turbo-charged vehicle engine sound simulator (10) that is designed to function in combination with a vehicle having a coil (92), a tachometer (94), an alternator (96), an engine manifold (98) having a manifold absolute pressure (MAP) sensor (100), and a battery (90). The simulator (10) utilizes an engine RPM source (12), a vacuum pressure switch (14), a turbo-sound storage unit (28), a power amplifier (30), a loudspeaker (32) and a regulated power supply (34) to accurately reproduce the sound that is heard from a blow-off valve on a turbo-charged engine. The simulator (10) allows a person to provide the appearance that his/her vehicle is equipped with a turbo-charger.

20 Claims, 3 Drawing Sheets

TURBO-CHARGED VEHICLE ENGINE SOUND SIMULATOR

TECHNICAL FIELD

The invention pertains to the general field of simulated vehicle sounds and more particularly to an electronic device that simulates the sound produced by a blow-off valve attached to a turbo-charged vehicle engine.

BACKGROUND ART

For many people, a vehicle is much more than simply a means of transportation. For as long as vehicles, and specially automobiles, have been produced, owners have sought to personalize them in many different ways. There are simple ways of adding an individual touch to an automobile, such as choosing a particular color. other, more complicated means include adding or removing body panels and improving certain mechanical functions. One of the most widely used type of automobile improvements is to alter the engine 50 that the automobile has more power and better performance.

There are many different ways by which a person or manufacturer can improve an automobile's performance. Two of the most effective means were originally utilized for race cars: a turbo-charger and a super-charger. While both the turbo-charger and the super-changer operate on similar principles, they are each unique in their own way.

Most automobile manufacturers know that taking a standard, normally-aspirated-engine car or truck, and adding a turbo-charger, will significantly improve the performance, and often more importantly, the public's perception. Because of the association that turbo-chargers have with race-cars and other high-performance vehicles, many do-it-yourself turbo installation kits have become available. The quality of these kits varies, but ultimately most kits do provide some amount of turbo-charged performance.

Unfortunately, what many people do not seem to understand is that for normal daily driving or commuting a turbo charger is simply not necessary. While it is true that turbo-charging certain vehicles, such as diesel cars and trucks, does add much-needed power, most gasoline powered vehicles have enough power without a turbo-charger.

If there were a way that a person could give the appearance that their vehicle is turbo-charged without actually having a turbo-charger, it would be very popular. Some people simply use stickers or other indicia that is placed on the vehicle with legends such as "turbo-charged" or "turbo-powered".

Unfortunately, a turbo-charger has a very distinct sound. Anybody with the slightest knowledge of turbo-chargers would know whether or not a vehicle is truly turbo-charged as a result of the sound, which is caused by a blow-off valve. Now, if there was a way to replicate the sound, a person could possess a vehicle that truly appears to be turbo-charged, without having to go through the expense and work of installing or having installed an actual turbo-charger.

A search of the prior art patents and industry literature did not disclose any turbo-charged vehicle engine sound simulators that read on the claims of the instant invention.

DISCLOSURE OF THE INVENTION

The invention consists of a turbo-charged vehicle engine sound simulator that is designed to reproduce the sound that is heard when a turbo-charger engages within a vehicle engine. On vehicles that are equipped with a turbo charger, such as race cars and other high-performance vehicles, there is a very distinct sound that is produced from the blow-off valve when the turbo-charger begins functioning. For many people, this sound indicates that the vehicle has just received a substantial increase in power, which further indicates that the vehicle will soon be traveling much faster. The instant invention will allow a person to produce the sound of a turbo-charger engaging, on a vehicle that is not equipped with an actual turbo charger.

The simulator works in combination with a vehicle having a coil, a tachometer, an alternator, an engine manifold having a manifold absolute pressure (MAP) sensor, and a battery. The simulator assembly in its basic design is comprised of an engine revolutions-per-minute (RPM) source, having means for producing an engine RPM signal. A vacuum pressure switch having means for being set to a vacuum pressure corresponding to a selected engine RPM. The vacuum pressure switch also has means for receiving the engine RPM signal and for producing an RPM signal corresponding to the set RPM. A turbo-sound storage unit having means for receiving and processing the RPM signal and producing a turbo-sound signal. The turbo-sound signal simulates the sound of the blow-off valve that is connected to a turbo-charged engine. A power amplifier is utilized to receive and amplify the turbo-sound signal, and to produce a loudspeaker drive signal. A loudspeaker receives the loudspeaker drive signal and then produces the sound of the blow-off valve, which can be heard inside and outside the vehicle. A regulated power supply is employed to provide the required voltage and current to operate the simulator.

In view of the above disclosure, the primary object of the invention is to provide a turbo-charged vehicle engine sound simulator that can accurately reproduce the sound that is heard from a blow-off valve on a vehicle equipped with a turbo-charger.

It is also an object of the invention to provide a turbo-charger vehicle engine simulator that:

- is easy to install,
- can be used on any vehicle having a four, six eight or twelve cylinder gas or diesel engine,
- does not interfere with the vehicle engine operation,
- is reliable, and maintenance free,
- can be "set" to engage at various engine RPM's,
- allows the timbre of the emitted sound to be selected, and
- is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
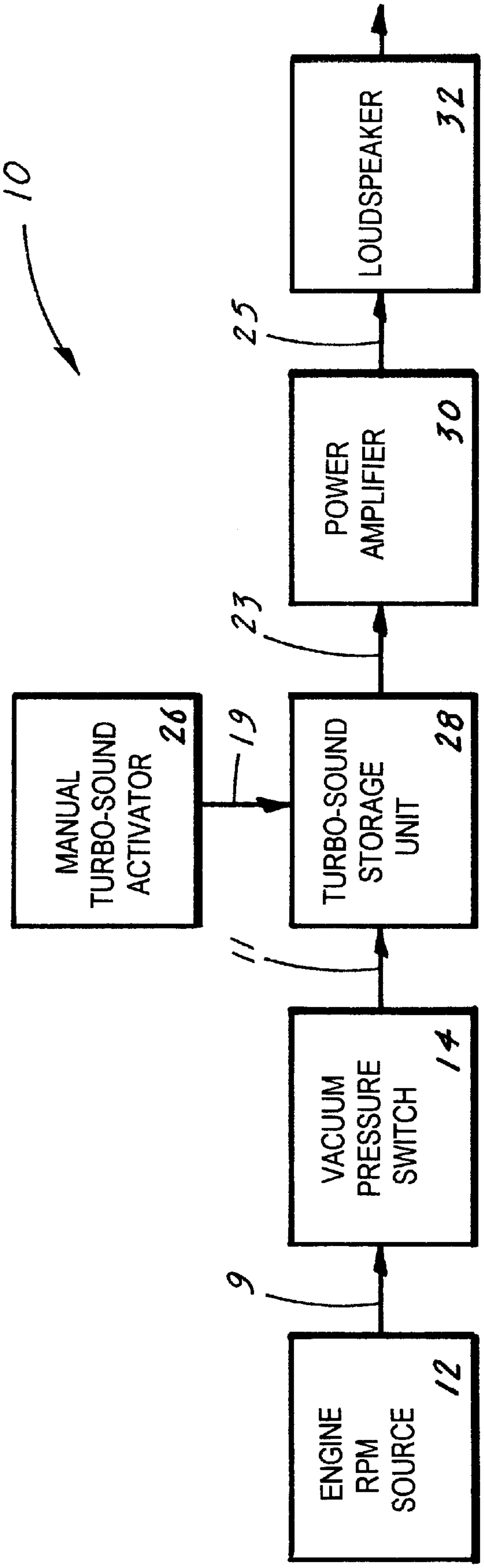
FIG. 1 is a block diagram showing the basic functional elements of the turbo-charged vehicle engine sound simulator.
Figure 2:
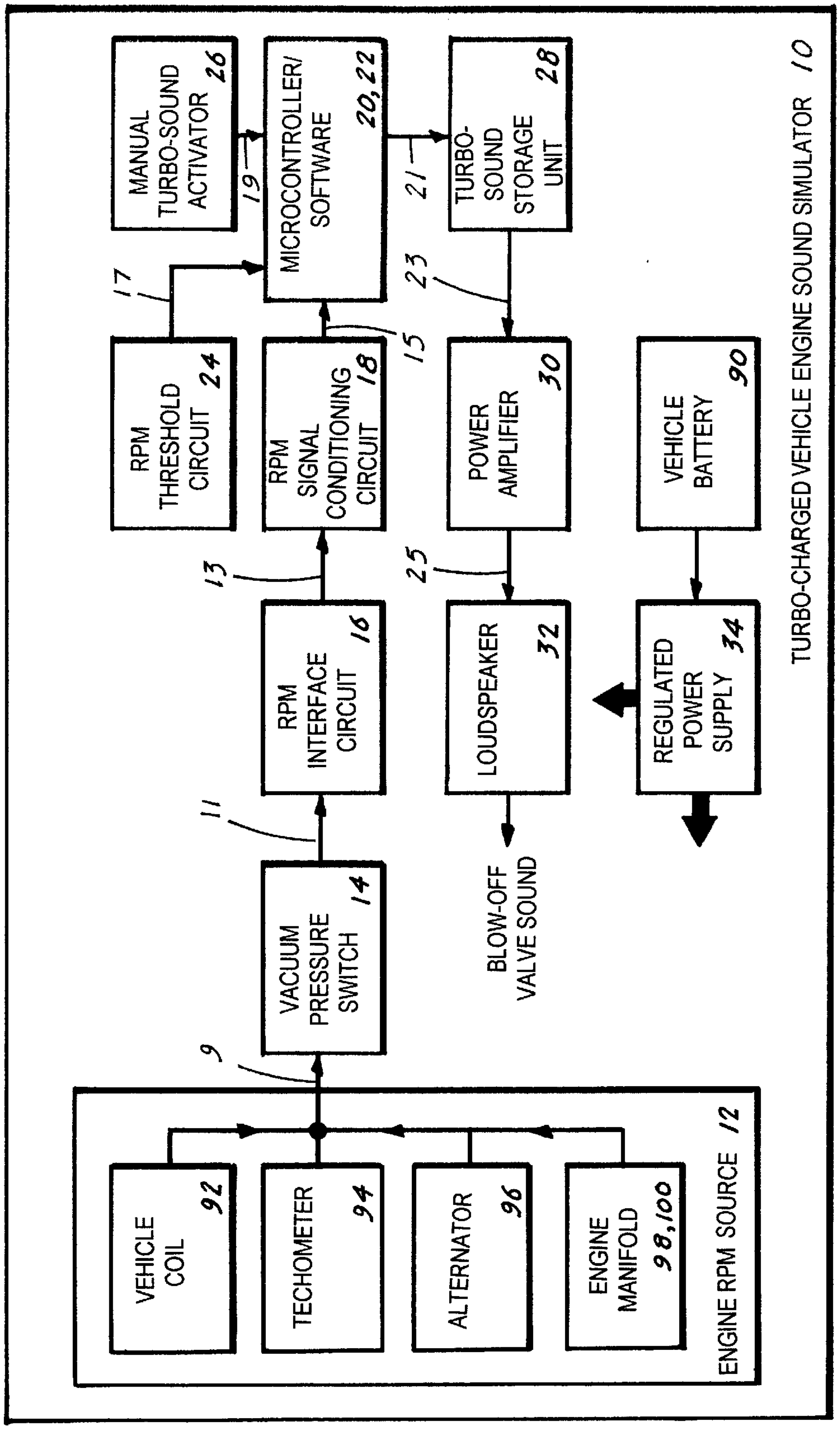
FIG. 2 is a block diagram showing the fully implemented design of the turbo-charged vehicle engine sound simulator.
Figure 3:
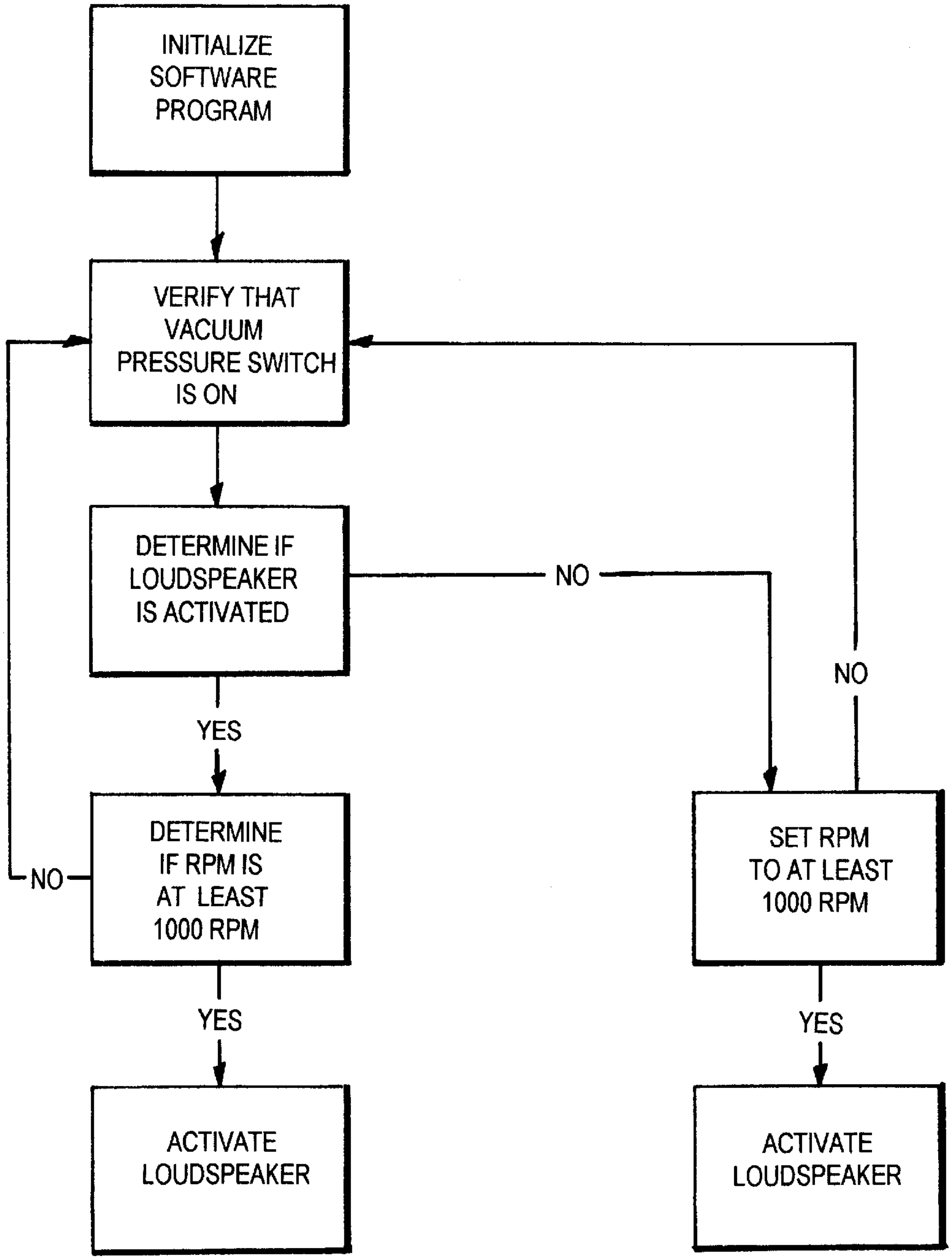
FIG. 3 is a block diagram showing the software program steps that are utilized to operate the simulator.

The turbo-charged vehicle engine sound simulator 10, (hereinafter, "simulator 10") is shown in its basic design in FIG. 1 and is described in the Disclosure of the Invention section. The best mode for carrying out the invention is shown in FIGS. 2 and 3, and is comprised of the following major elements: an engine RPM source 12, a vacuum pressure switch 14, an RPM interface circuit 16, an RPM signal conditioning circuit 18, a microcontroller 20 that operates with software 22, an RPM threshold circuit 24, a manual turbo-sound activator 26, a turbo-sound storage unit 28, a power amplifier 30, a loudspeaker 32, and a regulated power supply 34. The simulator 10 is adapted to function in combination with a vehicle battery 90 and one of the following components, a vehicle coil 92, a tachometer 94, an alternator 96, or an engine manifold 98 having a manifold absolute pressure (MAP) sensor 100.

The engine RPM source 12 has means for producing an engine RPM signal 9 that corresponds to the vehicle engine RPM. The vacuum pressure switch 14 has means for being set to a vacuum pressure that corresponds to a selected engine RPM. The vacuum pressure switch 14 also has means for receiving the engine RPM signal 9 and producing an RPM signal 11 that corresponds to the set RPM. The RPM interface circuit 16 has means for receiving and converting the RPM signal 11 to a corresponding RPM digital signal 13.

The RPM signal conditioning circuit 18 has means for receiving and converting the RPM digital signal 13 to a pulse-width modulated signal 15. The RPM threshold circuit 24 has means for producing an RPM threshold logic signal 17.

The manual turbo-sound activator 26 has means for producing an RPM trigger signal 19. The microcontroller 20, as shown in FIG. 2 is preferably comprised of a PIC microcontroller, and has a first input that is applied the pulse-width modulated signal 15 from the RPM signal conditioning circuit 18. A second input is applied the RPM threshold logic signal 17 from the RPM. threshold circuit 24. The microcontroller 20 has means for processing the two input signals and producing a logic control signal 21. The turbo-sound storage unit 28 has means for receiving the logic control signal 21 from the microcontroller 20 and producing a turbo-sound signal 23 that simulates the sound of a blow-off valve that is attached to a turbo-charged vehicle engine.

The power amplifier 30 has means for receiving the turbo-sound signal 23 and producing a loudspeaker drive signal 25. The loudspeaker 32, has means for receiving the loudspeaker drive signal 25 and producing the sound of the blow-off valve that is heard both within the vehicle and outside of the vehicle. The loudspeaker 32 can be comprised of either a moving-coil loudspeaker or an electrostatic loudspeaker.

In order to provide the required voltage and current to operate the simulator 10, the regulated power supply 34 is utilized. As shown in FIG. 2, the power supply 34 has an input derived from the vehicle battery 90.

As shown in FIG. 2, the engine RPM source 12 can be comprised of the vehicle coil 92, the vehicle tachometer 94, the vehicle alternator 96, or the manifold absolute pressure (MAP) sensor 100 which is located on the vehicle engine manifold 96. When the engine RPM source 12 is comprised of the vehicle coil 92, the engine RPM signal 9 is derived from the negative terminal of the coil 92. When the engine RPM source 12 is comprised of the vehicle tachometer 94, the engine RPM signal 9 is derived from the tachometer's output leads. When the engine RPM source 12 is comprised of the vehicle alternator 96, the engine RPM signal 9 is derived from the alternator's output leads. And, when the engine RPM source 12 is comprised of the MAP sensor 100, the engine RPM signal 9 is derived from the MAP's vacuum pressure line.

The simulator 10 can further be comprised of a manually-operated turbo-sound activator 26. When the activator 26 is activated, an RPM trigger signal 19 is produced that is applied to a third input on the microcontroller 20. The application of the RPM trigger signal 19 to the microcontroller 20 produces the logic control signal 21 that is applied to the turbo-sound storage unit 28.

The microcontroller 20 is operated by the software program 22, which controls the functions and operation of the simulator 10 and is comprised of the following steps as shown in FIG. 3:

1) initialize the software program 22,
2) verify that the vacuum pressure switch 14 is in the "on" position. If the switch 14 is "on", proceed to step 3.
3) determine if the loudspeaker 32 has been activated. If the loudspeaker 32 is activated, proceed to step 4; if the loudspeaker is not activated, proceed to step 6,
4) determine if the vehicle engine is operating at at least 1000 RPM's. If the engine is operating at 1000 RPM's, proceed to step 5; if the engine is not operating at 1000 RPM's, return to step 2,
5) activate the loudspeaker 32 to allow the blow-off valve sound to be heard,
6) determine if the vehicle engine is operating at at least 1000 RPM's. If the engine is operating at 1000 RPM's, proceed to step 7; if the engine is not operating at 1000 RPM's return to step 2,
7) activate the loudspeaker 32 to allow the blow-off valve sound to be heard.

In order to add further utility to the simulator 10, the RPM threshold circuit 24 is comprised of a variable resistor that is set at the specific RPM when the blow-off valve sound will be heard from the loudspeaker 32. The blow-off valve sound itself, which is located in the turbo-sound storage unit 28, is pre-recorded on a flash memory device.

Also, the simulator 10 can be programmed to operate with a four, six, eight or twelve cylinder gasoline, or diesel engine.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A turbo-charged vehicle engine sound simulator adapted to function in combination with a turbo-charged vehicle-engine having a coil, a tachometer, an alternator, an engine manifold having a manifold absolute pressure (MAP) sensor, and a vehicle battery, said simulator comprising:

a) an engine revolutions-per-minute (RPM) source having means for producing an engine RPM signal, b) a vacuum pressure switch having means for being set to a vacuum pressure corresponding to a selected engine RPM and having further means for receiving the engine RPM signal and for producing an RPM signal corresponding to the set RPM, c) a turbo-sound storage unit having means for receiving and processing the RPM signal and producing a turbo-sound signal that simulates the sound of a blow-off valve that is connected to the turbo-charged vehicle engine, d) a power amplifier having means for receiving and amplifying the turbo-sound signal and producing a loudspeaker drive signal, e) a loudspeaker having means for receiving the loudspeaker drive signal and producing the sound of the blow-off valve that is heard within and outside the confirms of the vehicle, and f) a regulated power supply designed to provide the required voltage and current to operate said simulator, wherein said power supply has an input derived from the vehicle battery.

2. The simulator as specified in claim 1 wherein when said engine RPM source is comprised of the vehicle coil, the engine RPM signal is derived from the negative terminal of the vehicle coil.

3. The simulator as specified in claim 1 wherein when said engine RPM source is comprised of the vehicle tachometer, the engine RPM signal is derived from the tachometer's output leads.

4. The simulator as specified in claim 1 wherein when said engine RPM source is comprised of the vehicle alternator the engine RPM signal is derived from the alternator's output leads.

5. The simulator as specified in claim 1 wherein when said engine RPM source is comprised of the MAP sensor located on the vehicle engine manifold, the engine RPM signal is derived from the MAP's output leads.

6. The simulator as specified in claim 1 wherein the blow-off valve sound in said turbo-sound storage unit is pre-recorded on a flash memory device.

7. The simulator as specified in claim 1 further comprising a manual turbo-sound activator that when activated produces an RPM signal that is applied to and activates said turbo-sound storage unit.

8. A turbo-charged vehicle engine sound simulator adapted to function in combination with a turbo-charged vehicle engine having a coil, a tachometer, an alternator, an engine manifold having a manifold absolute pressure (MAP) sensor, and a vehicle battery, said simulator comprising:

a) an engine RPM source having means for producing an engine RPM signal corresponding to the vehicle engine RPM, b) a vacuum pressure switch having means for being set to a vacuum pressure corresponding to a selected engine RPM and further means for receiving the engine RPM signal and for producing an RPM signal corresponding to the set RPM, c) an RPM interface circuit having means for receiving and converting the RPM signal to a corresponding RPM digital signal, d) an RPM signal conditioning circuit having means for receiving and converting the RPM digital signal to a pulse-width modulated signal, e) an RPM threshold circuit having means for producing an RPM threshold logic signal, f) a manual turbo-sound activator having means for producing an RPM trigger signal, g) a microcontroller having a first input that is applied the pulse-width modulated signal from said RPM conditioning circuit, and a second input that is applied the RPM threshold logic signal from said RPM threshold circuit, wherein said microcontroller having means for processing the two input signals and producing a logic control signal, h) a turbo-sound storage unit having means for receiving the logic control signal from said microcontroller and producing a turbo-sound signal that simulates the sound of a blow-off valve that is attached to a turbo-charged vehicle engine, i) a power amplifier having means for receiving and amplifying the turbo-sound signal and producing a loudspeaker drive signal, j) a loudspeaker having means for receiving the loudspeaker drive signal and producing the sound of the blow-off valve that is heard within and outside the confines of the vehicle, and k) a regulated power supply designed to provide the required voltage and current to operate said simulator, wherein said power supply has an input derived from the vehicle battery.

9. The simulator as specified in claim 8 wherein when said engine RPM source is comprised of the vehicle coil, the engine RPM signal is derived from the negative terminal of the coil.

10. The simulator as specified in claim 8 wherein when said engine RPM source is comprised of the vehicle tachometer, the engine RPM signal is derived from the tachometer's output leads.

11. The simulator as specified in claim 8 wherein when said engine RPM source is comprised of the vehicle alternator, the engine RPM signal is derived from the alternator's output leads.

12. The simulator as specified in claim 8 wherein when said engine RPM source is comprised of the MAP sensor located on the vehicle engine manifold, the engine RPM signal is derived from the MAP's vacuum pressure line.

13. The simulator as specified in claim 8 wherein said microcontroller is comprised of a PIC microcontroller.

14. The simulator as specified in claim 8 further comprising a manually-operated turbo-sound activator that when activated produces an RPM trigger signal that is applied to a third input on said microcontroller, whereupon the application of the RPM trigger signal to said microcontroller produces the logic control signal that is applied to said turbo-sound storage unit.

15. The simulator as specified in claim 14 wherein said microcontroller is operated by a software program that comprise's the following steps:

a) initialize said software program, b) verify that the vacuum pressure switch is in the "on" position, wherein if said switch is "on" proceed to step c), c) determine if said loudspeaker is activated, if "yes", proceed to step d), if "no", proceed to step f), d) determine if the vehicle engine is operating at at least 1000 RPMs, if "yes" proceed to step e), if "no" return to step b);

e) activate said loudspeaker to allow the blow-off valve sound to be heard, f) determine if the vehicle engine is operating at at least 1000 RPMs, if "yes" proceed to step g), if "no" return to step b), and g) activate said loudspeaker to allow the blow-off valve sound to be heard.

16. The simulator as specified in claim 8 wherein said RPM threshold circuit is comprised of a variable resistor set at the specific RPM when the blow-off valve sound will be heard from said loudspeaker.

17. The simulator as specified in claim 8 wherein the blow-off valve sound in said turbo-sound storage unit is pre-recorded on a flash memory device.

18. The simulator as specified in claim 8 wherein said loudspeaker is comprised of a moving-coil loudspeaker.

19. The simulator as specified in claim 8 wherein said loudspeaker is comprised of an electrostatic loudspeaker.

20. The simulator as specified in claim 8 wherein said simulator can be programmed to operate with a four, six, eight or twelve cylinder gasoline or diesel engine.

* * * * *